(12) United States Patent
Hushyar et al.

(10) Patent No.: US 7,484,145 B1
(45) Date of Patent: Jan. 27, 2009

(54) METHOD FOR EMBEDDED INTEGRATED END-TO-END TESTING

(75) Inventors: Kaveh Hushyar, Saratoga, CA (US); Behzad Nadji, Los Gatos, CA (US); Mostafa Tofighbakhsh, Cupertino, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 60 days.

(21) Appl. No.: 11/233,540

(22) Filed: Sep. 23, 2005

(51) Int. Cl.
*G01R 31/28* (2006.01)
(52) U.S. Cl. .................................................. 714/724
(58) Field of Classification Search .................. 714/36, 714/39, 46, 724, 799; 705/400
See application file for complete search history.

(56) References Cited

U.S. PATENT DOCUMENTS

| | | | |
|---|---|---|---|
| 5,500,941 A | 3/1996 | Gil | |
| 5,715,461 A | 2/1998 | Yoshitomi | |
| 5,784,553 A | 7/1998 | Kolawa et al. | |
| 5,794,043 A | 8/1998 | Kolb | |
| 5,974,255 A | 10/1999 | Gossain et al. | |
| 6,018,713 A * | 1/2000 | Coli et al. | 705/2 |
| 6,023,580 A | 2/2000 | Sifter | |
| 6,219,829 B1 | 4/2001 | Sivakumar et al. | |
| 7,158,024 B2 * | 1/2007 | Chung et al. | 340/515 |
| 7,228,461 B2 * | 6/2007 | Krietemeyer et al. | 714/45 |
| 2002/0107653 A1 * | 8/2002 | Kraffert | 702/119 |

* cited by examiner

*Primary Examiner*—Phung M Chung

(57) ABSTRACT

A method and system for automated testing of a system such as a billing module in a telecommunication system is disclosed. In a first embodiment, test APIs, scenarios and configuration information are embedded into the module itself in a way such that, when testing is desired, tests may be conducted without any need for a dedicated test environment. Tests can be run from within the module itself, thereby eliminating the risk, expense and time required to use external testing systems and data to test the module. In another embodiment, operational data such as live operational orders are wrapped in test headers and are used as input data for testing purposes within the billing module. In this embodiment, test APIs may be embedded into all modules of an operational support system so that complete system end-to-end testing is possible without the use of dedicated external test equipment and processes.

12 Claims, 6 Drawing Sheets

METHOD FOR EMBEDDED INTEGRATED END-TO-END TESTING

BACKGROUND OF THE INVENTION

As complex converged telecommunication networks designed to provide a wide range of services to customers become more prevalent, the need for thorough testing becomes important prior to operationally releasing any replacement module or improvement to any part of the system. For example, operational support systems (OSSs) in telecommunication systems have many different elements that require frequent updates and improvements when new services are introduced to customers. Such OSS systems typically include order management, design and engineering, carrier interconnection, service provisioning, inventory, service activation, billing, customer care and service assurance modules. These modules are able to interact with each other and various modules and networks and also must be able to accept input from and provide information to external elements, such as sales, engineering and technician personnel. Accordingly, such systems are complex and require careful configuration control. When a new element of a system, such as a billing module, is inserted into the system, an integration system test is typically conducted to verify the configuration, compatibility and proper operation of the module. In the case of today's large converged telecommunication networks, such tests can be correspondingly very large and complex in scope.

Typically, such tests involve creating a comprehensive set of test data and running that data through the new module/system element under a variety of test scenarios involving various system configurations and loads. These test scenarios are typically created independently of the system under test and involve integrating special test equipment with the system prior to testing. As the data is processed by the system, intermediate results are monitored at various points throughout the system in order to ensure proper functioning of the system. Any faults are detected through the detection of anomalous data at these monitoring points. As a result of the complexity involved in integrating test equipment and validating test data/scenarios, such large integration systems tests (ISTs) are typically long in duration, expensive and risky.

SUMMARY OF THE INVENTION

The present invention essentially solves the aforementioned problems. The present inventors have invented a method and system for automated testing of a system such as a billing module in a telecommunication system. In a first embodiment, test APIs, scenarios and configuration information are embedded into the module itself in a way such that, when testing is desired, tests may be conducted without any need for a dedicated test environment. Tests can be run from within the module itself, thus eliminating the risk, expense and time required to use external testing systems and data to test the module. In another embodiment, operational data such as live operational orders are wrapped in test headers and are used as input data for testing purposes within the billing module. In yet another embodiment, test APIs are embedded into all modules of an operational support system in a way such that complete system end-to-end testing is possible without the use of dedicated external test equipment and processes.

DETAILED DESCRIPTION

Figure 1:
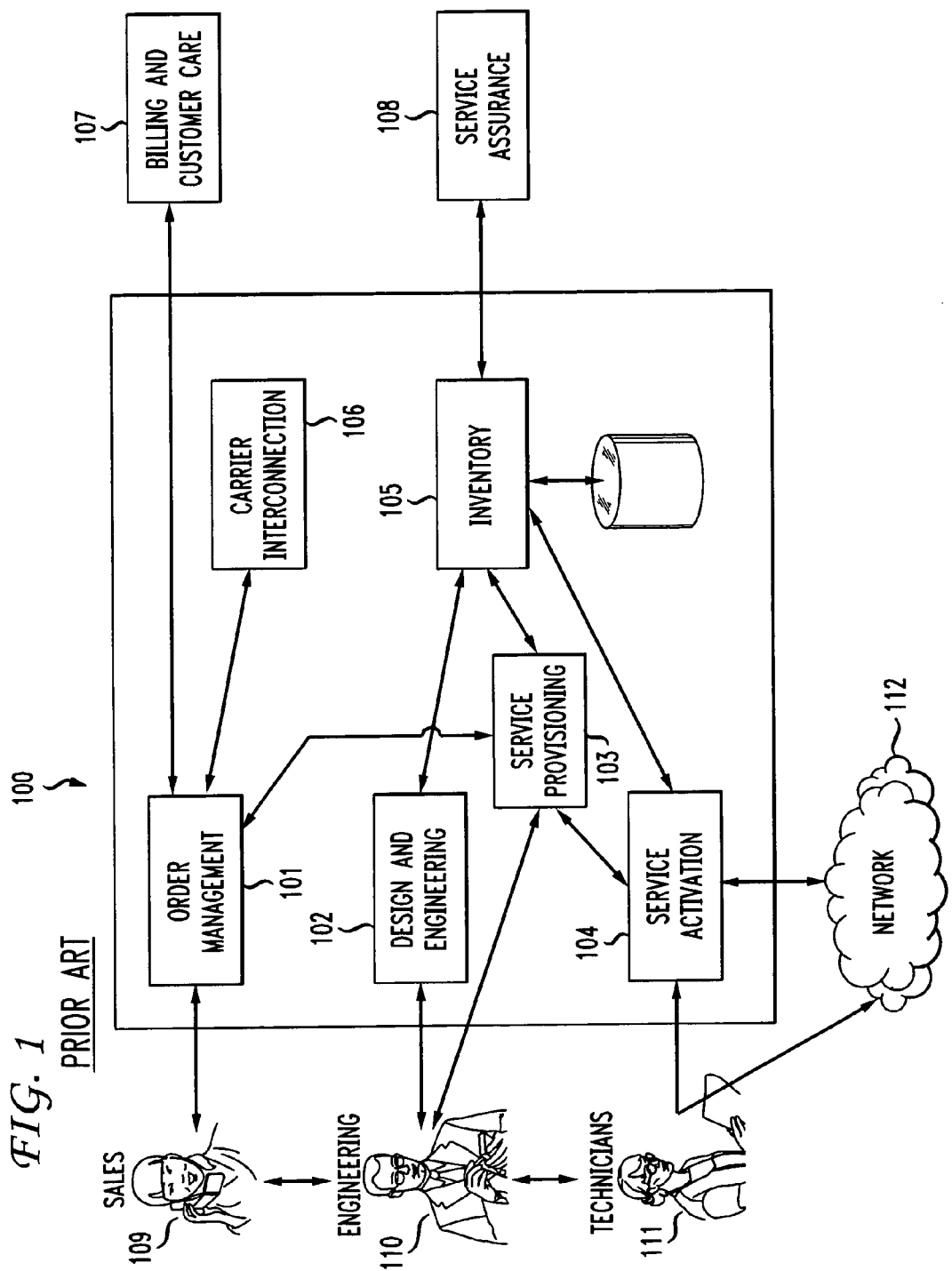
FIG. 1 shows an illustrative operational support system associated with a telecommunications network.

FIG. 1 shows an illustrative operational support system (OSS) associated with a telecommunication network. OSS 100 has, illustratively, order management module 101, design and engineering module 102, service provisioning module 103, service activation module 104, inventory module 105, carrier interconnection module 106, billing module 107 and service assurance module 108. Illustratively, sales departments/personnel 109 input information (e.g., sales) to the order management module 101 and provide feedback (e.g., requests for improvement to the system) to engineering department 110. Engineering department 110, for example, performs system design and engineering functions using design and engineering module 105; service provisioning using service provisioning module 103 and communicates activation and network configuration requirements to technicians 111. Technicians 111 perform the actual service activation functions and configure 112 according to system requirements such as those determined to be necessary by engineering department 110.

Figure 2:
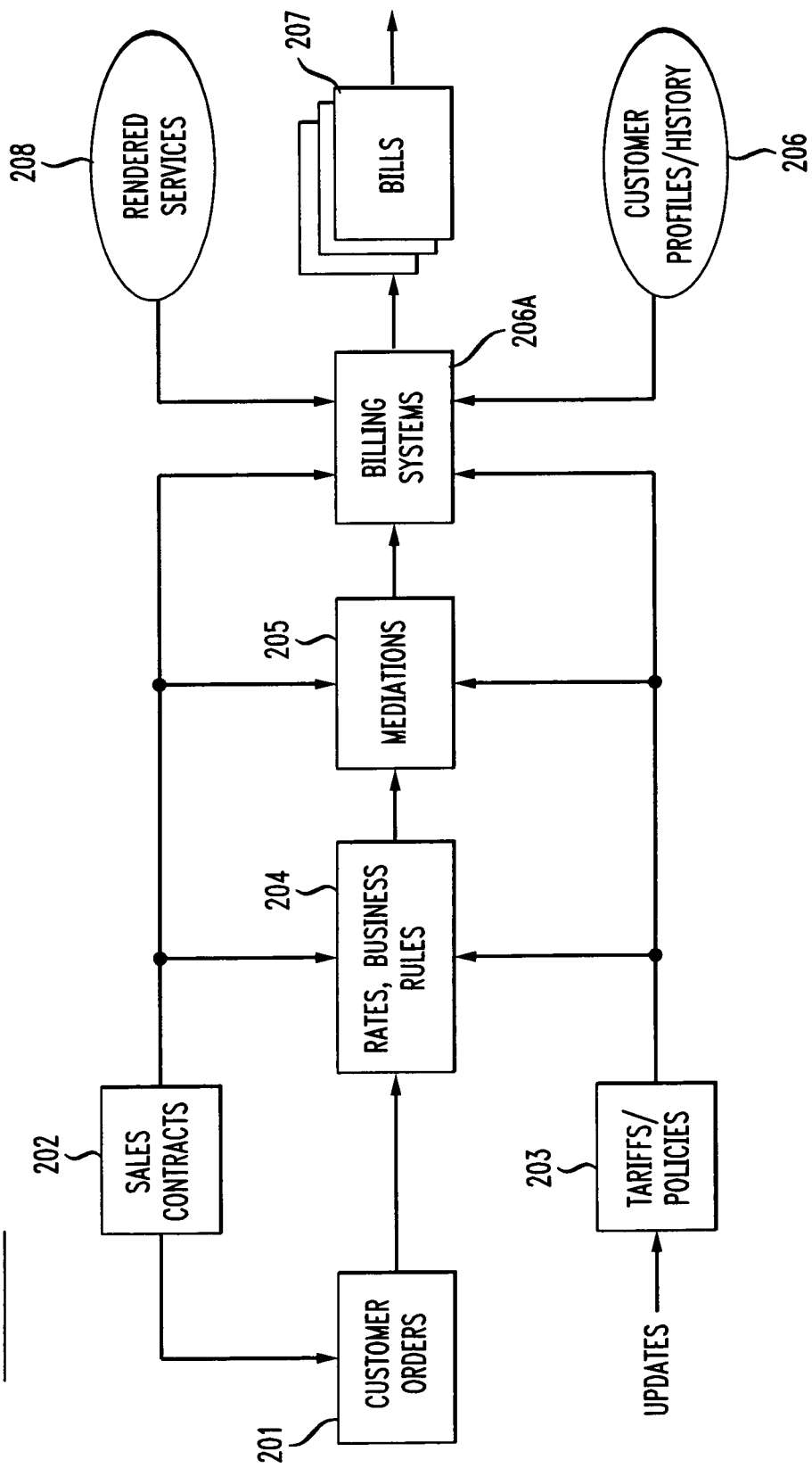
FIG. 2 shows an illustrative billing system within the operational support system of FIG. 1.

One skilled in the art will recognize that the different modules of the OSS of FIG. 1 are typically legacy systems that may have been in operation for a significant period of time. Each module in the system may have been added or updated independently from other elements of the system and may have been developed by different suppliers. FIG. 2 shows one functional module of the system of FIG. 1, specifically billing module 107, showing the various aspects of functionality of the billing module. Referring to FIG. 2, in operations of the billing module, customer orders 201 are received and sales contracts 202 are generated. These customer orders 201 and sales contracts 202, together with tariff policies 203, are used as input to establish service rates and business rules 204 for operation. Any mediations 205, or changes to the established rates and business rules, are used to modify those rates and rules. The resulting rate is input into the billing system 206A, along with sales contract 202 information and tariff policy 203 information. When services 208 are rendered, the billing system 205 is referred to for rate information and, along with the customer profile/history 206, is used to generate bills 207. Information from such bills is used to update the customer profile/history 206 and is used to bill the customer for the rendered services 208. The billing system of FIG. 2 may be, for example, implemented in a computer adapted to perform the functional steps discussed above.

Figure 3:
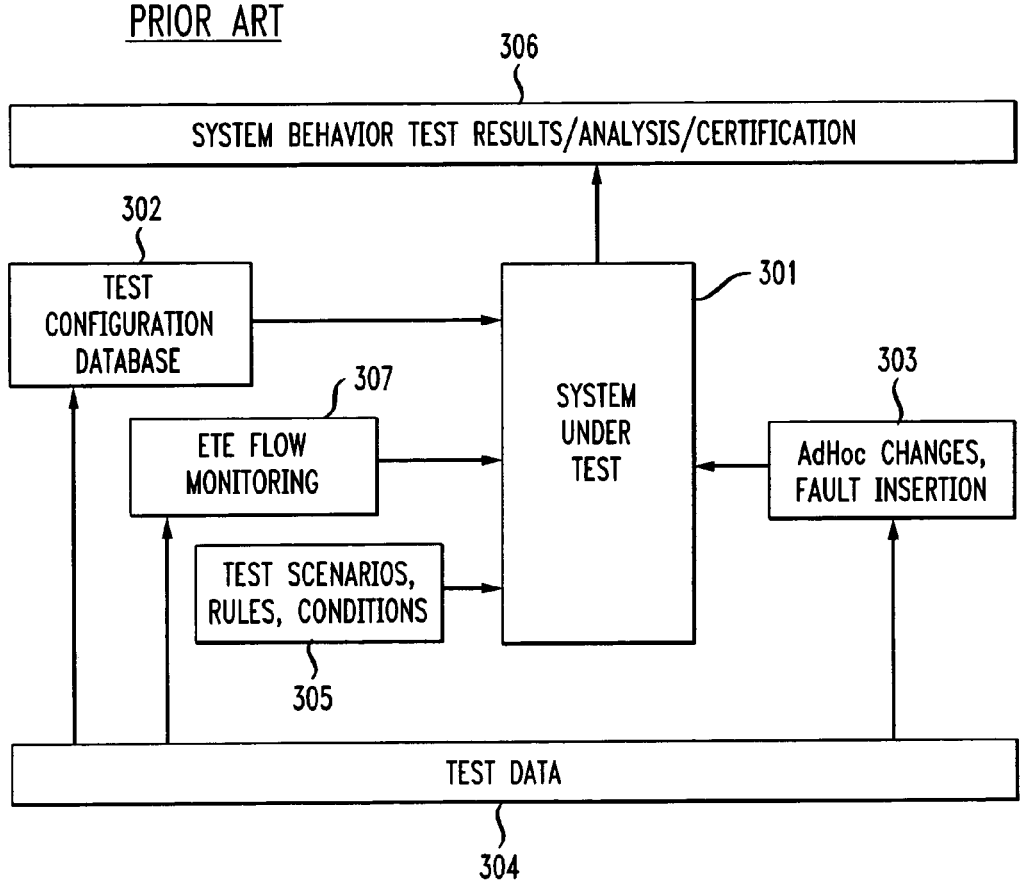
FIG. 3 shows an illustrative programmable computer.

When a new billing system, such as the billing system of FIG. 2, is added as a new module in the OSS system of FIG. 1, then, as discussed above, an entire dedicated test of the system is typically conducted. As also discussed above, such tests involve creating a comprehensive set of test data and running that data through the new module/system element under a variety of test scenarios involving various system configurations and loads. FIG. 3 shows a block diagram of a prior test configuration. In that figure, system 301 is the system that is to be tested. Test configuration database 302 contains environmental data dictating the configuration of the system. Test scenario module 305 inputs test rules and conditions for the test. Test data 304, generated by scripts, users, simulated data and from other sources, is input into the test system via the test configuration database where it is formatted appropriately. Faults in the data may intentionally be inserted by ad hoc change module 303 to test the ability of the system to handle such faults. End-to-End (ETE) flow monitoring module 307 monitors the data flow in the systems during the test and compares the data flow with the original test data to determine proper handling of the data flow. The data flow output by the systems 301 is collected and monitored by a test results/analysis/certification module 306. Thus, as shown by the prior configuration of FIG. 3, testing of a system such as integration system testing was typically conducted by applying externally-generated configuration settings, scenarios and test data to a system and then extracting test data results from that system for analysis. One skilled in the art will recognize that, while the above elements of the test system of FIG. 3 are discussed in terms of modules, they may be either stand alone systems operated on different computer systems, or alternatively, may be implemented on a single computer system. One skilled in the art will recognize that these elements may also be input manually as opposed to being operated by a computer system.

Figure 4:
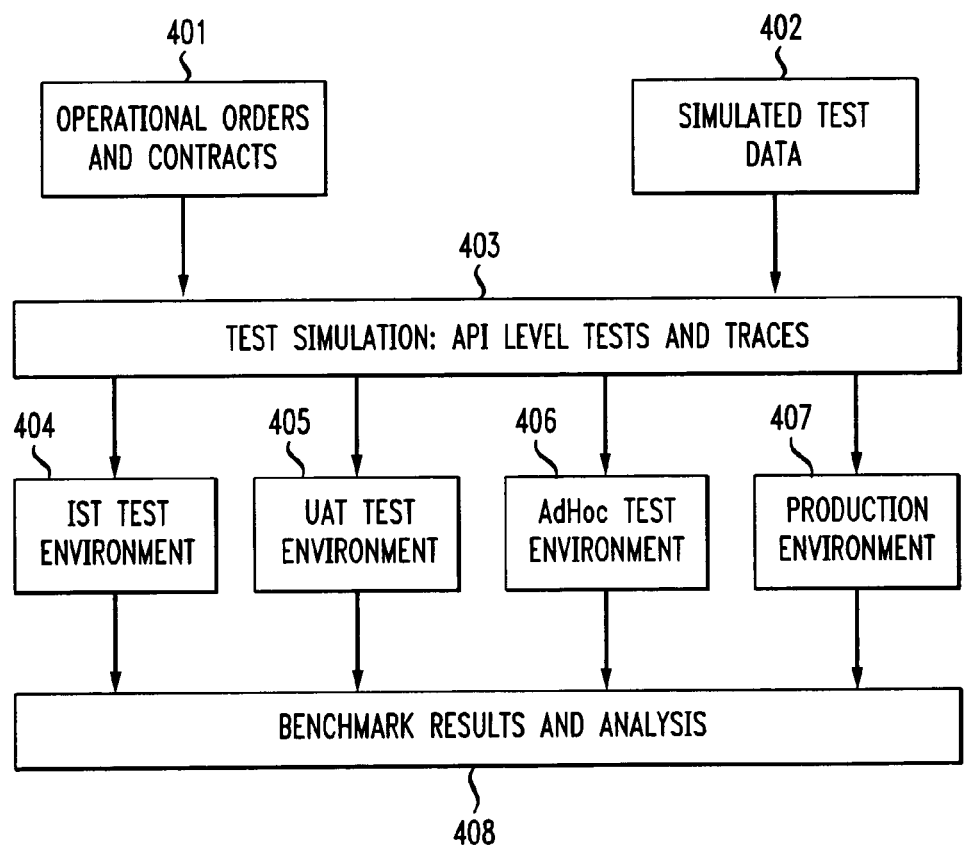
FIG. 4 shows a prior configuration for testing of the billing system of FIG. 2.

The present inventors have recognized that testing of an illustrative billing system, such as accomplished by the test arrangement of FIG. 3, is cumbersome, expensive and risky. Therefore, in accordance with the principles of the present invention, test application programming interfaces (APIs) are embedded into the modules of operational systems. Test scenarios can thus be embedded into the billing system module itself to allow for automated end-to-end testing at any desired time. FIG. 4 shows an illustrative test configuration of a billing system, such as the billing system of FIG. 2, in accordance with one embodiment of the principles of the present invention. Specifically, instead of applying externally-generated configuration, scenario and data collection functions to a system, these functions are integrated within the modules of the system itself. Referring to FIG. 4, therefore, orders and contracts 401 are created and or stored internally to the billing system and may be, for example, actual operational orders collected and stored for testing purposes. Simulated data 402, which consists of, for example, simulated contracts and orders, may also be used to test specific features of the system. In contrast to prior systems, as discussed above, instead of applying test scenarios and configurations from an external source to the system to be tested, test APIs, scenarios and configurations 403 are already integrated within the actual system modules to facilitate testing internal to the system. Internal test data points are accumulated by, for example, embedded test software agents adapted to collect such data. For example, these agents have well-known APIs that collect statistics as to types of data flowing through the system while in operation. The data points are optimized for complete regressing testing when a new software release is loaded.

Therefore, for example, when a new billing module is inserted within the system, the infrastructure for a test such as an integrated system test is already in place. This internal test infrastructure can be automated so that, when a test transaction of a particular format is inserted into the system, that transaction will trigger one or more predefined test scenarios and configurations. Thus, due to the integrated nature of the test configurations, different environments may be run simultaneously through the same system, such as an IST test environment 404, where integrated system tests are run, the user acceptance test (UAT) environment 405, where acceptance tests and/or operational readiness tests may be run and the AdHoc test environment 406 where specialized or ad hoc tests are run. As discussed above, these tests may be run prior to the operational use of the system to verify the operational integration and readiness of the system. The results of this data may be output as benchmark results and analysis 508. Accordingly, by using a test configuration according to the above-described principles, the time and expense associated with connecting and configuring external test elements/equipment with a system to be tested is essentially eliminated. Additionally, such a test configuration leads to a less-risky test since the uncertainty of interoperability of the different test elements with the system is eliminated.

Figure 5:
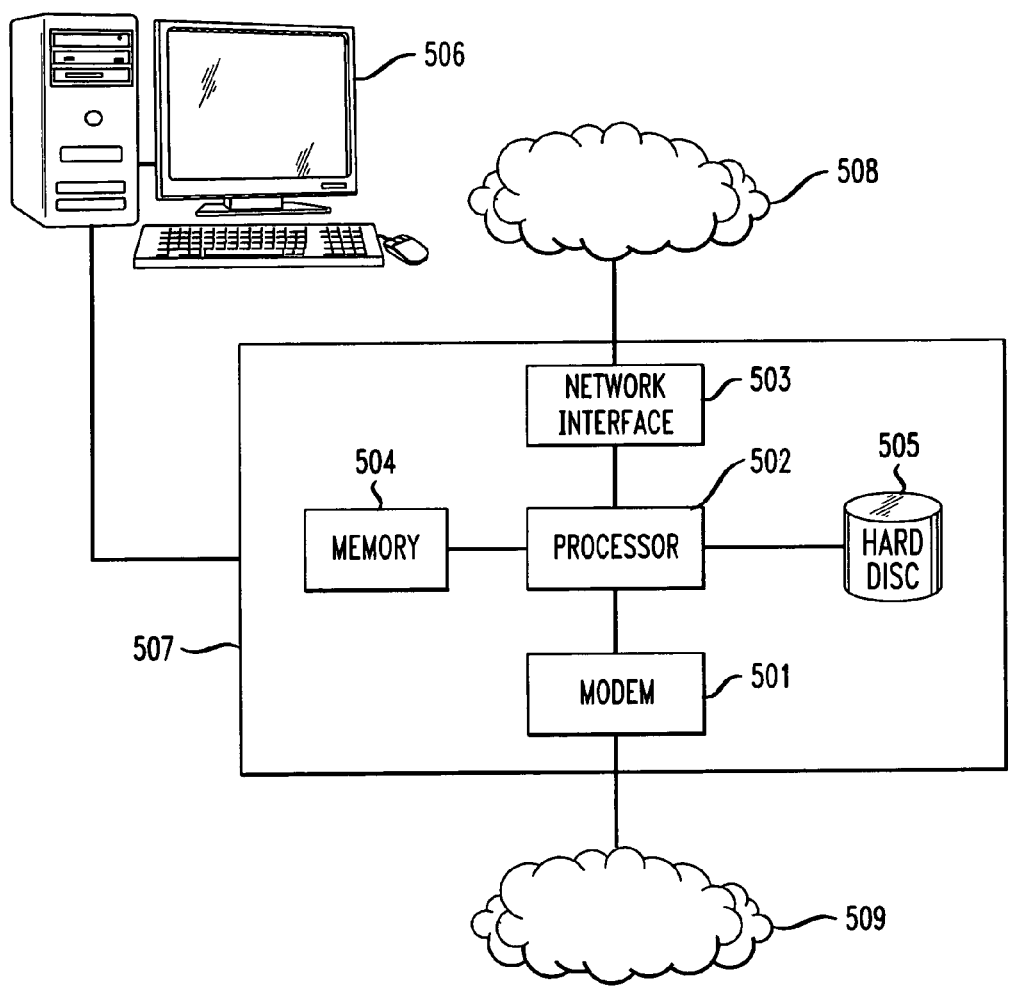
FIG. 5 shows a configuration for testing of the billing system of FIG. 2 in accordance with the principles of the present invention.

The billing system of FIG. 4 may be, for example, implemented in a computer adapted to perform the functional steps discussed above. Referring to FIG. 5, graphical computer 507 may be implemented on any suitable computer adapted to receive store and transmit data such as the aforementioned billing information. Referring to FIG. 5, illustrative computer 507 may have, for example, a processor 302 (or multiple processors) which controls the overall operation of the graphical computer 507. Such operation is defined by computer program instructions stored in a memory 504 and executed by processor 502. The memory 504 may be any type of computer readable medium, including without limitation electronic, magnetic, or optical media. Further, while one memory unit 504 is shown in FIG. 5, it is to be understood that memory unit 504 could comprise multiple memory units, with such memory units comprising any type of memory. Graphical computer 507 also comprises illustrative modem 501 and network interface 503. Modem 501 is used to connect, for example, to network 509 in FIG. 5 and network interface 503 is used to connect to network 509. Graphical computer 507 also illustratively comprises a storage medium, such as a computer hard disk drive 505 for storing, for example, data and computer programs adapted for use in accordance with the principles of the present invention as described hereinabove. Finally, graphical computer 507 also illustratively comprises one or more input/output devices, represented in FIG. 5 as terminal 506, for allowing interaction with, for example, a service provider technician or database administrator. One skilled in the art will recognize that graphical computer 507 is merely illustrative in nature and that various hardware and software components may be adapted for equally advantageous use in a computer in accordance with the principles of the present invention.

One skilled in the art will recognize in light of the foregoing that, in addition to conducting tests prior to operation or production implementation, a benefit of incorporating the test infrastructure directly into the system modules is that such tests may be conducted at any time. Therefore, to ensure the proper operation of a system after installation, for example, tests may be run in parallel to operations of the production system or traces may be run through the production environment 407 in FIG. 4 itself. This testing may be accomplished entirely transparently to operational transaction data. Therefore, one skilled in the art will recognize in light of the foregoing that ETE testing may be accomplished in a very flexible manner. For example, audit tracing or testing may be "turned on" automatically when an unexpected or anomalous data point is detected in operational use. In such a case, a trigger will initiate a known flow of data using a predetermined system configuration and scenario to test the system and produce benchmarks or other data for analysis. One skilled in the art will also recognize that such tests may be conducted periodically in response to the expiration of a time period. Thus, benchmarks such as transaction timeliness, end to end user response times and resource (e.g., central processing unit/memory) utilization may be tested and analyzed periodically.

While the foregoing discussion is centered on testing of a billing system by integrating test functionality within the billing module, one skilled in the art will recognize that it may be desirable to also integrate test functionality into other modules. Thus, for example, an ordering module might contain a test API by which it can collect operational data and use it for test purposes by forwarding it via the test API to the billing module. Such operational data, for example operational orders generated in response to customer purchases, may be wrapped in a test header that will trigger the test procedures in the billing module when received by that module. Each different module in the system, such as system 100 of FIG. 1, may contain similar test APIs in order to facilitate true system end to end testing in an automatic fashion.

Figure 6:
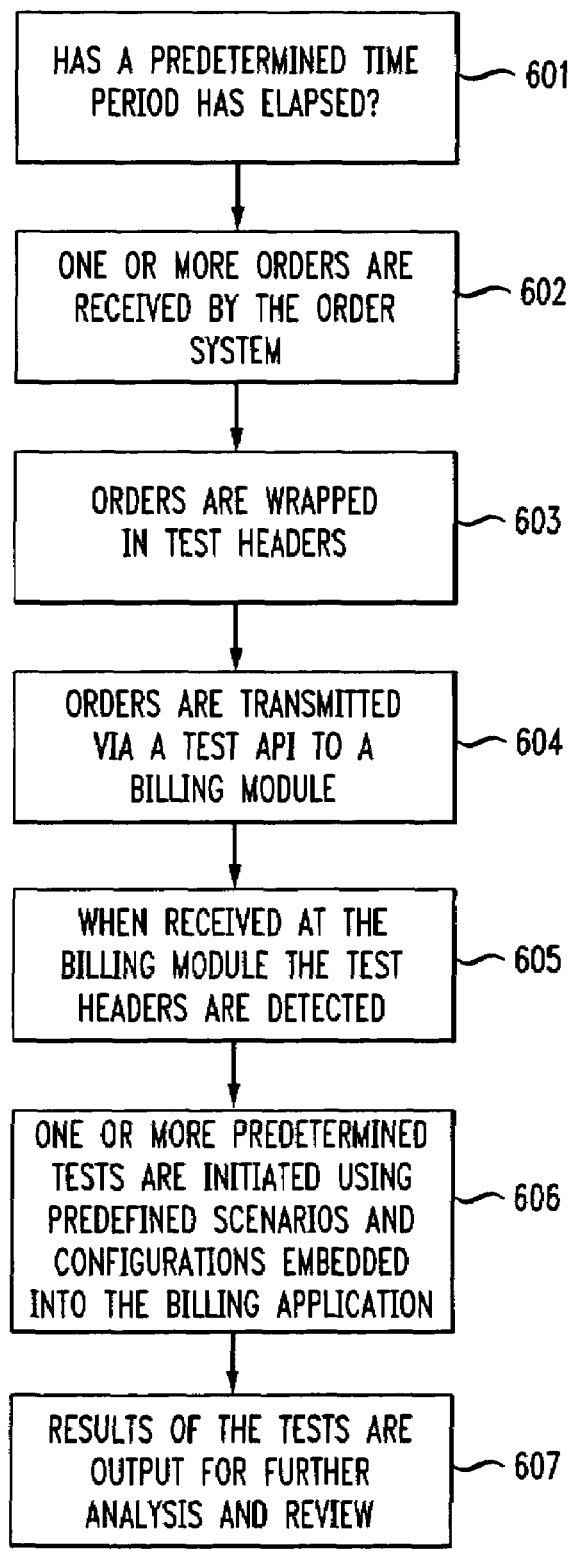
FIG. 6 is a flow chart showing the steps of one illustrative method in accordance with the principles of the present invention.

FIG. 6 shows a flow chart of a method in accordance with the principles described herein above. The method of FIG. 6 may be, illustratively, performed a programmable computer such as programmable computer 507 of FIG. 5. Referring to FIG. 6, at step 601, a determination is made whether a predetermined time period has elapsed. If the time has elapsed then, at step 602, one or more orders are received by the order system. At step 602, these orders are wrapped in test headers. At step 603, the orders are transmitted via the test API to the billing module. When received at the billing module, at step 604, the test headers are detected and a test environment or an operational trace is invoked. At step 605, one or more predetermined tests are initiated using predefined scenarios and configurations embedded into the billing application. Then, at step 606, results of the tests are output for further analysis and review.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for use in testing a module in a computer system comprising:
   receiving at said module a plurality of test orders generated internally to said computer system;
   detecting that said test orders are associated with a test to be conducted;
   initiating said test using said test orders and at least a first predefined configuration embedded within said module; and
   outputting results from said test.

2. The method of claim 1 further comprising, prior to said step of detecting, determining that one or more tests of said module is desired.

3. The method of claim 2 wherein said step of determining comprises determining that a predetermined time period has elapsed.

4. The method of claim 2 wherein said step of determining comprises detecting anomalous data within one or more operational messages.

5. The method of claim 1 wherein said step of detecting comprises detecting a test flag in a header of a message transmitting one or more of said test orders.

6. The method of claim 1 wherein said test comprises an integrated system test.

7. The method of claim 1 wherein said test comprises a user acceptance test.

8. The method of claim 1 further comprising:
   creating a plurality of test environments, said test environments adapted to conduct separate tests simultaneously.

9. A telecommunication system comprising:
   a network interface for receiving a plurality of orders;
   a memory device for storing said orders;
   a processor adapted to recognize at least a first test order in said plurality of orders, said processor further adapted to initiate a test using said at least a first test order and at least a first predefined configuration embedded within a module of said telecommunication system; and
   an output device for outputting test results from said module.

10. The telecommunication system of claim 9 wherein said at least a first predefined configuration comprises data collected by an embedded software agent during the operations of said system.

11. The telecommunication system of claim 9 wherein said processor is adapted to identify a flag in a header of one or more orders in said plurality of orders.

12. The telecommunication system of claim 9 wherein said processor is adapted to initiate said at least a first test while simultaneously processing one or more orders not associated with said at least a first test.

\* \* \* \* \*

UNITED STATES PATENT AND TRADEMARK OFFICE
CERTIFICATE OF CORRECTION

PATENT NO. : 7,484,145 B1
APPLICATION NO. : 11/233540
DATED : January 27, 2009
INVENTOR(S) : Kaveh Hushyar et al.

Page 1 of 1

It is certified that error appears in the above-identified patent and that said Letters Patent is hereby corrected as shown below:

Column 2, line 11, change "FIG. 3" to -- FIG. 5 --; line 12, change "FIG. 4" to -- FIG. 3 --; and line 14, change "FIG. 5" to -- FIG. 4 --.

Column 4, line 17, change "508" to -- 408 --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,484,145 B1  Page 1 of 1
APPLICATION NO. : 11/233540
DATED : January 27, 2009
INVENTOR(S) : Kaveh Hushyar It is certified that error appears in the above-identified patent and that said Letters Patent is hereby corrected as shown below:

Column 2, line 11, change "FIG. 3" to -- FIG. 5 --; line 12, change "FIG. 4" to -- FIG. 3 --; and line 14, change "FIG. 5" to -- FIG. 4 --.

Column 4, line 17, change "508" to -- 408 --.

Signed and Sealed this

Tenth Day of November, 2009

David J. Kappos
*Director of the United States Patent and Trademark Office*